United States Patent [19]

Hullen

[11] Patent Number: 4,602,664
[45] Date of Patent: Jul. 29, 1986

[54] METHOD AND APPARATUS FOR COLLECTING LAWN DEBRIS AND PACKAGE FOR SUCH APPARATUS

[76] Inventor: George W. Hullen, 643 Bancroft Rd., Bricktown, N.J. 08724

[21] Appl. No.: 752,495

[22] Filed: Jul. 8, 1985

Related U.S. Application Data

[63] Continuation of Ser. No. 542,462, Oct. 17, 1983, abandoned.

[51] Int. Cl.⁴ .......................................... B65D 65/02
[52] U.S. Cl. ........................ 150/52 R; 383/4; 383/24; 383/30; 206/83.5; 256/1; 56/1; 24/30.5 R; 24/30.5 L
[58] Field of Search ............... 150/521 R; 383/4, 15, 383/24, 25, 30, 31; 206/83.5; 256/1, 12.5, 32, 45, 48; 15/257.1; 56/1, 329; 24/16 R, 16 BP, 17 B, 30.5 R, 30.5 L, 30.5 S; 43/4.5, 8, 7, 100

[56] References Cited

U.S. PATENT DOCUMENTS

| | | | |
|---|---|---|---|
| 853,833 | 5/1907 | Saum, Jr. | 56/329 |
| 1,079,527 | 11/1913 | Wallace | 383/30 |
| 1,762,881 | 6/1930 | Nicolayson | 43/7 |
| 2,766,797 | 10/1956 | Cowen | 150/52 R |
| 3,002,240 | 10/1961 | Laguerre | 24/30.5 L |
| 3,347,297 | 10/1967 | Garland | 383/1 |
| 3,430,754 | 3/1969 | Meseke et al. | 383/24 |
| 3,483,907 | 12/1969 | Corridon | 383/25 |
| 3,548,906 | 12/1970 | Murphy | 383/25 |
| 3,762,454 | 10/1973 | Wilkins, Jr. | 383/1 |
| 3,779,494 | 12/1973 | Nicholson et al. | 24/16 PB |
| 3,795,654 | 5/1974 | Kirkpatrick | 383/1 |
| 3,924,669 | 12/1975 | Price | 150/52 R |
| 3,980,176 | 9/1976 | Boggs | 206/83.5 |
| 4,015,719 | 4/1977 | Hanopole | 248/100 |
| 4,058,956 | 11/1977 | Skonieczny | 15/257.1 |
| 4,270,247 | 6/1981 | Freedom | 24/16 PB |
| 4,324,061 | 4/1982 | Stepp | 43/8 |
| 4,366,949 | 1/1983 | Staub, Sr. | 150/52 R |
| 4,384,604 | 5/1983 | DeLaura et al. | 150/52 R |
| 4,388,959 | 6/1983 | Handy et al. | 150/52 R |
| 4,445,230 | 4/1984 | Spadaro | 383/26 |

FOREIGN PATENT DOCUMENTS 1276833 10/1961 France ................... 383/24

Primary Examiner—Joseph Man-Fu Moy
Assistant Examiner—David T. Fidei
Attorney, Agent, or Firm—Gordon W. Kerr

[57] ABSTRACT

Flat pieces of netting material are placed on the ground to catch leaves as they fall from nearby trees. When the leaves have fallen the net blanket is bundled up into a net package for disposal. The packages may or may not require a bag closure. A novel net bag closure for such packages is also disclosed. The bag closure also forms a handle for carrying the bundled leaf package. The net blankets may also be hung from trees to catch the leaves thereof before they reach the ground. The netting may be folded and then rolled onto a hollow tube for merchandising, with accessories contained in the hollow tube.

3 Claims, 18 Drawing Figures

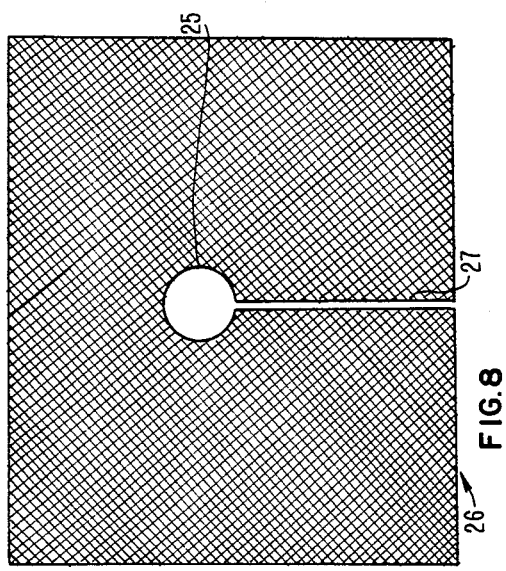
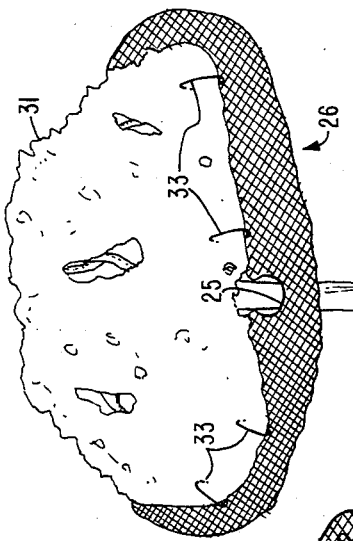
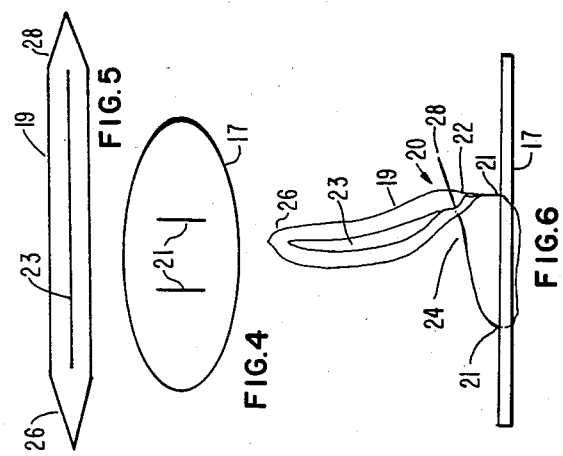
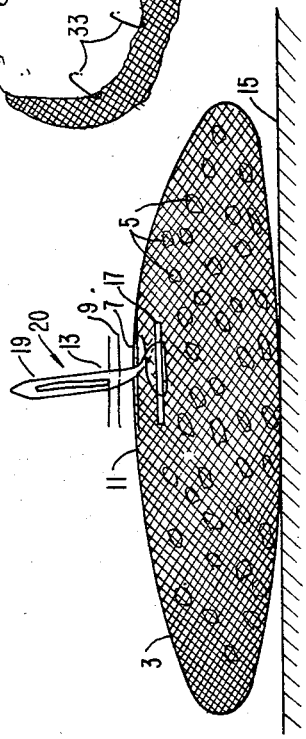
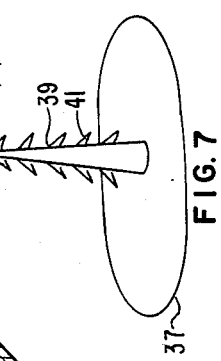
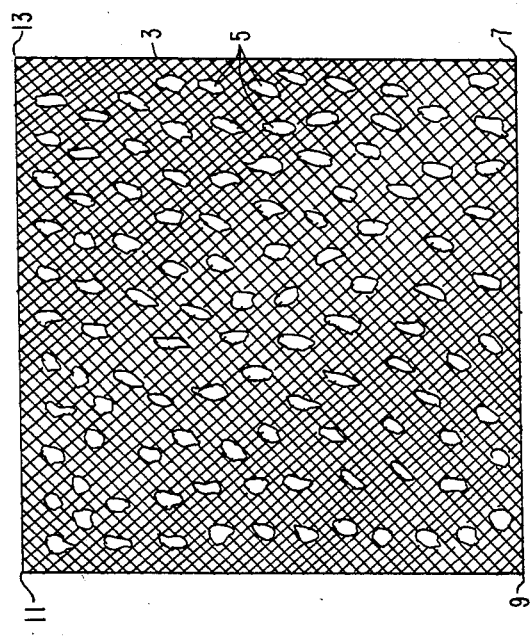
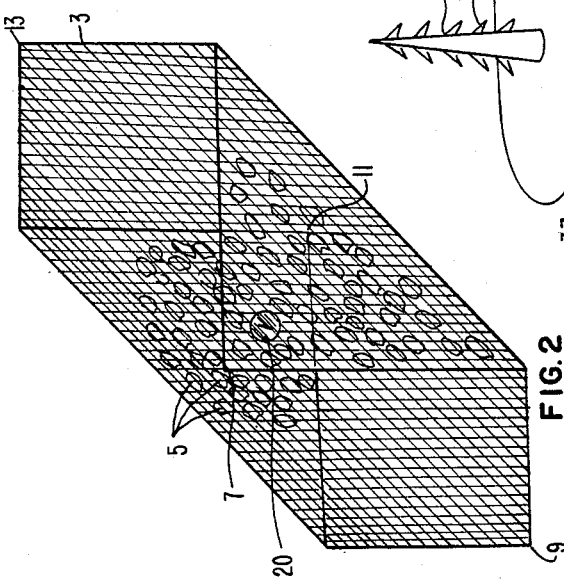

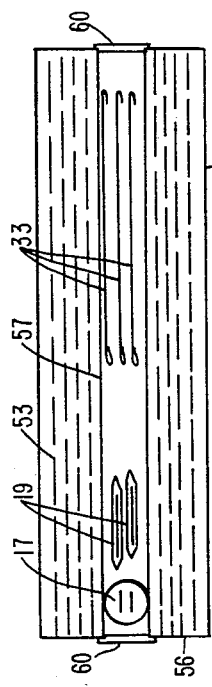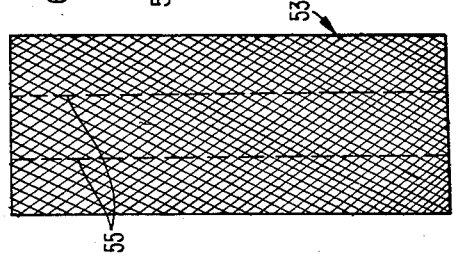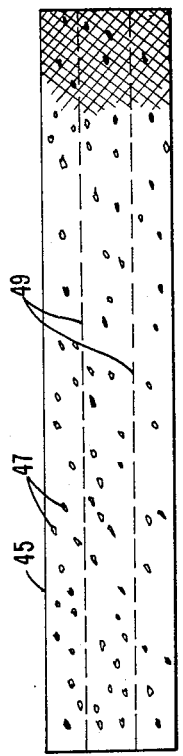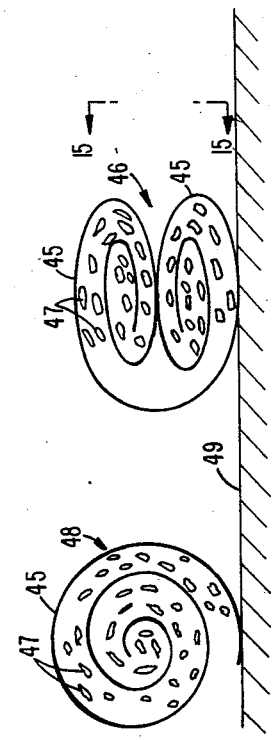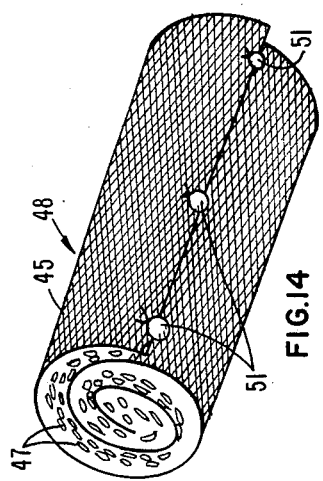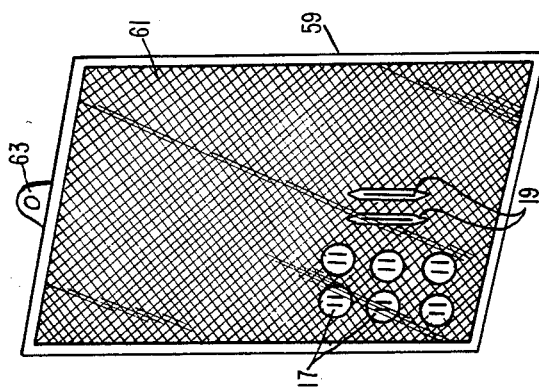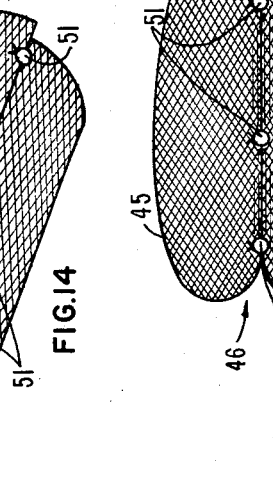

METHOD AND APPARATUS FOR COLLECTING LAWN DEBRIS AND PACKAGE FOR SUCH APPARATUS

This application is a continuation of Ser. No. of 06/542,462 filed 10-17-83, now abandoned.

BACKGROUND OF THE INVENTION

This invention relates to the collection and disposal of fallen leaves and other lawn debris and more particularly to a novel method and apparatus for such collection and disposal and also to novel merchandising packages for such apparatus, as well as a novel bag closure for net bags.

Numerous devices have been developed to aid the householder in removing fallen leaves from yards and gardens. Leaves are sometimes raked into piles along streets where they are collected by large municipally owned vacuum trucks, sometimes they are burned after raking but local laws often prohibit such burning. Perhaps the most common method presently is to stuff the raked leaves into plastic bags which are then tied and disposed of as trash.

Tarpaulins, blankets or other pickup cloths can be spread on the grass and bundled up after the debris, mainly leaves, is raked or swept onto them. One problem of this method is that the cloth must be staked down to facilitate the raking of debris over the edge thereof. A pickup cloth of this type is shown in U.S. Pat. No. 2,749,695, issued on June 12, 1956. The pickup cloth in that patent has rigid rods along opposite edges thereof with stakes attached to one of the rods and a detachable carrying handle to the other rod. The stakes facilitate the raking of the leaves into the cloth and after the cloth is filled the two rods are joined and the package carried with the handle. The leaves must be deposited somewhere since the apparatus is obviously not disposable.

U.S. Pat. No. 3,312,263, issued Apr. 4, 1967 shows a tote bag for fallen leaves which is set up on the ground with a flat panel thereof on the ground and the bag held open with a semi-circular support which must be bolted in place when the bag is set up and removed for subsequent storage of the bag. With this tote bag the leaves are simply collected and must be deposited somewhere for ultimate disposal. Also, the leaves must be raked into the bag.

U.S. Pat. No. 3,747,653, issued July 24, 1973, shows a metal bracket to which a leaf bag can be attached so that the bag is held open in a position to facilitate the sweeping of leaves therein.

All of the above methods and appliances suffer from one or more of the following disadvantages: The leaf packages are complex, expensive and difficult to manipulate and require raking of the debris into the package. Some are not disposable and hence may require another receptacle for ultimate disposition. Others are not feasible for recycling the organic matter of the leaves and other debris which can be re-used as soil nutrients.

The invention provides a simple, inexpensive and easily manipulated method and apparatus for fallen leaf and lawn debris collection and disposal in a way which facilitates the recycling thereof and also provides a disposable leaf package.

SUMMARY OF THE INVENTION

The concept of the invention involves collecting leaves in blankets of netting which are spread on the ground in areas in which leaves are expected to fall, for example around and under trees before the leaves start to fall or along fences or hedges where wind-blown leaves often collect. The meshwork of the netting is made small enough to catch and hold the smallest leaf or debris to be collected. After the leaves have fallen into the net blanket, it is bundled up for disposal. The entire net leaf package is disposable and hence the bundled package is simply placed in the trash, or it can be placed in a compost pile where the open meshwork will permit the leaves therein to decompose into re-usable compost.

Novel bag closures are provided for quickly and easily securing the net packages to facilitate the disposal thereof, and in one embodiment a combination bag closure and carrying handle is provided.

The net blankets and the accessories therefor may be merchandised by means of novel packages which may include a hollow tube on which a folded length of netting is rolled with the accessories packaged inside the hollow tube.

It is thus an object of the invention to provide a novel and useful method and apparatus for collecting and disposing of lawn debris which involves allowing leaves to fall onto a net blanket which is either placed on the ground or attached to a tree just before the leaves are to fall.

Another object of the invention is to provide a simple and inexpensive lawn debris receptacle comprising a flat piece of neting of plastic material in which the openings are dimensioned to catch and retain the smallest debris to be collected, and wherein said net blanket is folded or rolled up with the lawn debris trapped therein for disposal. If necessary, the folded or rolled receptacle may be secured with ordinary twist ties or with a novel net bag closure which also can provide a handle for conveniently carrying the leaf package.

A still further object of the invention is to provide a novel bag closure for net bags which can be easily assembled and applied to any net bag and which also provides a carrying handle for the net bag and its contents.

A further object of the invention is to provide a novel and useful leaf disposal method and apparatus in which the apparatus is disposable and facilitates the re-cycling of the leaves.

These and other objects and advantages of the invention will become apparent from the following detailed description and the drawings.

BRIEF DESCRIPTION OF THE DRAWINGS

FIG. 1 shows a net blanket with fallen leaves therein.

FIG. 2 shows one way in which the blanket of FIG. 1 can be folded to form a closed net bag.

FIG. 3 shows a cross sectional view of a leaf-filled net bag sealed with a novel closure.

FIGS. 4–6 illustrate a novel bag closure which can be applied to net blankets to form a net package.

FIG. 7 shows a different type of bag closure.

FIGS. 8 and 9 show how a blanket of netting may be attached to a tree to catch the leaves thereof as they fall.

FIG. 10 shows how several flat net blankets can be arranged around and under a tree.

FIG. 11 shows an elongated rectangular net blanket arranged on the ground along a fence.

FIG. 12 is a top view of an elongated net blanket with leaves thereon showing how it can be folded.

FIG. 13 shows how the net blanket of FIGS. 11 and 12 can be either folded lengthwise or rolled to form a package ready for disposal.

FIG. 14 shows a folded and rolled net blanket with closures applied thereto.

FIG. 15 shows a net blanket folded to form a package and secured with twist ties.

FIG. 16 shows how a flat rectangular piece of netting can be folded lengthwise to reduce its width so that it can be rolled onto a tube for merchandising.

FIG. 17 shows a merchandising package comprising a length of netting rolled onto a hollow tube which contains accessories.

FIG. 18 shows another type of merchandising package for the apparatus of the present invention.

DETAILED DESCRIPTION OF PREFERRED EMBODIMENTS

FIG. 1 is a top view of a square net blanket 3 lying flat on the ground, with fallen leaves 5 more or less evenly distributed thereon. This netting had been placed on the ground, usually on grass in a yard, before the leaves started to fall and was left there until all the leaves had fallen. Such a net blanket can be left indefinitely on grass without any adverse effects, since rain, light and air can easily penetrate the open meshwork to nurish the underlying grass.

The netting of blanket is preferably of plastic material, for example nylon which is readily available and inexpensive. Netting which has openings of about ½ to 1 inch is preferred and will catch and retain most leaves and other yard debris.

After the leaves have fallen the net blanket is bundled up into a disposable leaf package and sealed if necessary with an appropriate bag closure, which may be a simple twist tie or a specialized net bag closure of the type illustrated in FIGS. 3-7 herein. The leaf bags can be placed in a compost pile and the leaves will decompose naturally due to the open meshwork of the net leaf bags. When decomposition is complete the netting can be removed and thrown away or re-used if it is still servicable. If economically feasible a preferred material for the net blankets would be a biodegradable material if the leaf packages are to be composted. Thus the netting would decompose with the contents of the bag.

The leaf packages can be used as mulch by placing them in flower beds and around shrubs to insulate these plants from the cold. The leaves in the packages would decompose over the winter and by spring may be fully composted. Also the leaf packages can be placed along building foundations or walls to insulate the buildings.

FIG. 2 shows one way in which the net blanket of FIG. 1 can be folded to form a net leaf bag after all of the leaves have fallen therein. The four corners of the netting in FIGS. 1 and 2 are labelled 7, 9, 11 and 13. First the netting edges or corners are lifted up to bring the leaves into a pile in the middle of the blanket as shown in FIG. 2. Then two diagonally opposite corners of the blanket, for example the corners 7 and 11 are brought over the blanket center so that they overlap, as illustrated. A bag closure such as 20, illustrated in FIGS. 4-6, is then pushed up through the two net blanket corners 7 and 11. Then the other two corners 9 and 13 are similarly brought over the blanket center and the same blanket bag closure pushed through these corners to form a sealed leaf package such as that illustrated in FIG. 3.

The novel bag closure comprises a flat base 17 shown in FIG. 4 as a disc, but other shapes are feasible, for example the base 17 can be rectangular. A pair of slits 21 are cut in the base 17 near the center thereof. The handle 19 of FIG. 5 comprises a flat strip of flexible material, preferably plastic, with pointed ends 26 and 28 and a central slit 23 running overmost of its length. The bag closures would be conveniently shipped and sold as the two flat parts as shown in FIGS. 4 and 5 and assembled by the user just before use. FIG. 6 shows the assembled bag closure in which the handle end 28 has been pushed down through one slit in base 17 then up through the other slit 21. The longer end of the handle 19 is then given a half twist as at point 22 so that it can pass through the slit 23 in the short end 24 of the handle. The handle is then locked to the base 17 and the pointed end 26 of the handle can be pushed through the holes in the netting. When the handle has penetrated the last layer of netting, the slit 23 can be opened up by inserting several fingers therein so that a leaf package carrying handle results.

FIG. 3 is a vertical cross sectional view of a leaf package with this novel bag closure attached thereto and resting on the ground 15. As shown therein, the handle 19 has been pushed through the four corners 7, 9, 11 and 13 of the bag 3 to form a compact and easily portable and disposable leaf package.

In many cases it may not be necessary to use any bag closure since the net blankets can often be simply folded several times to trap the leaves therein and grasped from the bottom for transport.

FIG. 7 shows another type of bag closure comprising a base 37 with a central upstanding portion 39 which has a series of sawteeth 41 thereon which can be pushed easily in one direction but which will resist slipping out in the opposite direction. This closure would be pushed up through the layers of netting as is the closure of FIG. 6, but it does not provide a handle.

FIG. 8 shows how a square net blanket can be modified so that it can be attached to a tree, as shown in FIG. 9, to catch the leaves which fall therefrom. This embodiment, while more complicated than the net blankets which are simply placed on the ground, is more efficient since a relatively small blanket can catch most of the leaves of a tree which would otherwise spread over a large area of ground. The net blanket 26 of FIG. 8 has a central hole 25 large enough to accommodate the trunk of the tree and a slit 27 runs from the central hole to one edge of the blanket. This blanket is placed around the tree trunk 29 as shown in FIG. 9 and the blanket edges suspended from hangers 33 which may be wire rods with hooks at either end with the upper hooks attached to the lower branches of the tree and the lower hooks engaging the netting near the edges thereof.

FIG. 10 shows how a number of flat net blankets 35 can be arranged on the ground under a tree to collect the leaves which fall therefrom. The tree trunk is indicated at 30 in this plan view.

Fallen leaves often collect against a barrier such as a fence, a hedge or a building wall due to the action of the wind, and in accordance with one aspect of this invention, an elongated strip of netting can be placed on the ground parallel to such barrier for collecting the leaves blown there. FIG. 11 shows an elongated rectangular piece of netting 45 laid out along and parallel to a fence 43, with leaves 47 thereon. FIGS. 12 and 13 illustrate two different ways in which such a net blanket can be bundled for disposal. If the blanket 45 is more than 3 or 4 feet in width it is usually convenient to fold it one or more times parallel to its length to reduce its width and also to trap the leaves therein. The plan view of FIG. 12 shows the blanket before folding, with the dashed lines 49 indicating fold lines whereby the two longer edges would be folded over the middle third of the blanket to reduce the width by two thirds.

FIG. 13 is an elevation view showing how the blanket, folded as indicated in FIG. 12, can be either further folded from both ends to form the leaf package 46, or it can be rolled to form the package 48. The package 46 is formed by folding the net blanket into folds of convenient size from both ends and such a package, if longitudinally folded as indicated in FIG. 12, will have all the leaves trapped therein and thus can be lifted or grasped from the bottom thereof and transported for disposal with out the need for any closure devices. However if it is desired to seal or secure this package against unrolling or unfolding, the upper and lower folds, 52 and 54, thereof can be tied together with ordinary household twist ties, as indicated at 51 in FIG. 15. FIG. 15 is an elevational view of package 46 viewed along lines 15 of FIG. 13. The twist ties are simply threaded through the holes in the netting of the upper and lower folds and twisted.

FIG. 13 also shows how a package 48 can be formed by simply rolling the blanket 45 from one end to the other. This rolled package would normally require a closure which again could simply two or three twist ties which secure the outer end of the roll to the layer below it. FIG. 14 is an isometric view of the rolled package 48 secured in this way be three twist ties 51.

Leaves are often blown across property lines and end up on a neighbor's land. In order to prevent this a net barrier or fence can be set up on the property line to catch most of the wind-blown leaves before they leave the property of the owner of the trees. These barriers can be formed for example by driving two or more posts into the ground and stringing a horizontal rope or cord between them. The netting would be draped over the cord and extended along the ground for a short distance on one or both sides of the fence. The netting could be attached to the cord with twist ties. The netting would be bundled up as explained above when the leaves have been collected.

FIG. 16 shows an elongated rectangular piece of netting which may, for example be 10 feet wide and 40 or 50 feet long. Such a net blanket would be large enough for the largest application of the invention, and the plastic material thereof can be easily cut if smaller net blankets are required. Also, the net blankets of FIG. 8 could be cut by the user from such an elongated piece of netting. To reduce the width of the strip, it can be longditinally folded once or twice. If the 10 foot wide strip of FIG. 16 is folded twice along the dashed lines 55, the folded width will be reduced to 40 inches. This width of material can be wound on a hollow tube for convenient packaging and marketing. The interior of the hollow tube may contain accessories. Such a merchandising package is shown in FIG. 17, with the netting material 53 wound on a hollow tube 57, which may be stiff paper or plastic. The accessories shown are the bag closures of FIG. 6 comprising the base 17 and handles 19. The base 17 may be made of a bendable plastic or stiff paper material so that it can be bent somewhat, preferably along the lines of the slits 21 thereof, so that the disc shaped bases can be squeezed into a tube with a smaller inside diameter than the diameter of the discs 17. Also shown are three of the hangers 33 to be used for hanging the netting from trees as mentioned above. The package of FIG. 17 may or may not have flanges 56 at the ends thereof. It may include an outside wrapping 58 which may include a product label and also complete instructions for the use of the netting. The caps 60 can be pressed into the ends of the tube 57 to seal in the contents thereof.

FIG. 18 shows another merchandising package in which a flat piece of netting 61 is folded several times and placed in envelope 59. The envelope is preferably of clear plastic and may include accessories such as the bag clsoures comprising the bases 17 and handles 19, as well as the instructions and a label. The top of the envelope may have a grommet 63 so that the package can be hung on a peg at retail outlets.

The color of the netting can be chosen to contrast with the color of the grass so that the blanket edges can be easily located.

While the invention has been described in connection with illustrative embodiments, obvious variations therein will occur to those skilled in the art, accordingly the invention should be limited only by the scope of the appended claims.

I claim:

1. A self-gathering leaf package comprising a flat blanket of plastic net material which has been placed on the ground in an area where leaves are expected to fall, the openings in said net material being dimensioned to catch and retain the smallest leaves to be disposed of, said blanket having two pairs of diagonally opposite corners, and which blanket is bundled up after the said leaves have fallen to form a disposable leaf package by bringing the first pair of said diagonally opposite corners thereof into an overlapping position above the approximate center of said blanket and securing said first pair of corners with a bag closure which comprises a flat base larger than the openings in said net material with an elongated handle projecting generally perpendicular thereto, said handle being dimensioned to pass through said openings in said net material, and then the remaining pair of said diagonally opposite corners of said blanket are brought into an overlapping position above the first pair of corners and secured with said bag closure, and wherein the said diagonally opposite pairs of corners are secured by passing said handle through the said openings in said net material in the vicinity of said corners.

2. The leaf package of claim 1 wherein said elongated handle has a central slit along the long dimension thereof, which slit is adapted to receive a hand for carrying said bundled package.

3. The leaf package of claim 1 wherein said handle comprises flexible material and wherein said handle is attached to said base by being threaded through a pair of parallel slits in said flat base, and wherein said flat blanket is made from a biodegradable material.

* * * * *